Dec. 9, 1941.                F. M. DARNER                 2,265,129
            METHOD OF AND APPARATUS FOR WELDING TUBING OR THE LIKE
                              Filed Aug. 22, 1939
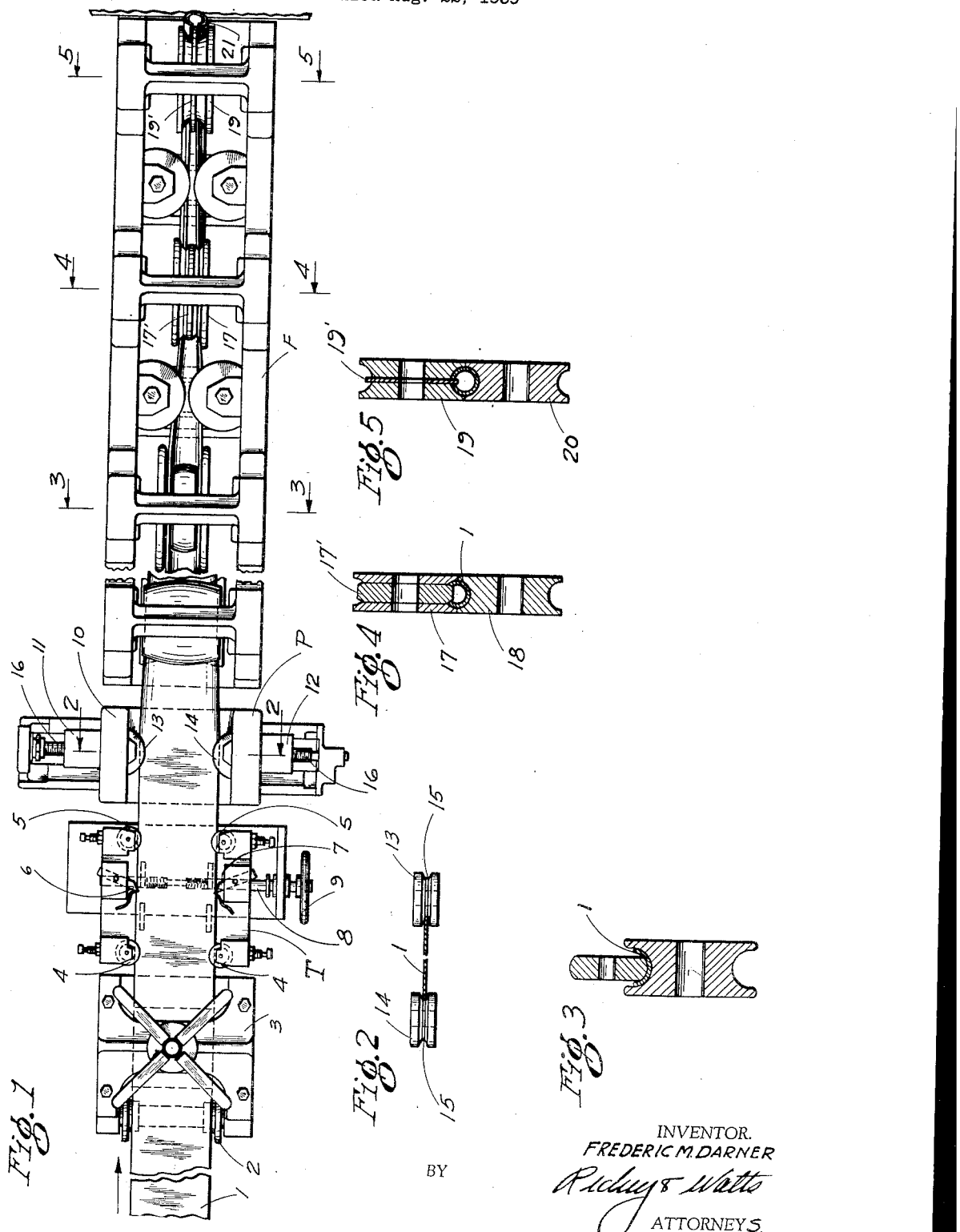
INVENTOR.
FREDERIC M. DARNER
BY
ATTORNEYS.

Patented Dec. 9, 1941

2,265,129

UNITED STATES PATENT OFFICE 2,265,129

METHOD OF AND APPARATUS FOR WELDING TUBING OR THE LIKE

Frederic M. Darner, Shaker Heights, Ohio, assignor, by mesne assignments, to Republic Steel Corporation, Cleveland, Ohio, a corporation of New Jersey Application August 22, 1939, Serial No. 291,374

5 Claims. (Cl. 29—33)

This invention relates to the manufacture of pipe or tubing by electrical resistance welding and more particularly to an improved method of preparing the edges of a moving strip of metal for butt welding into tubular form by electrical resistance welding.

In the manufacture of tubing by the high speed continuous electric welding processes it has been found that the condition of the abutting edges of the strip and their angular relation to each other is an important factor in obtaining a uniform and perfect weld. In high speed resistance welding of this type only the surface metal of the edges is raised to welding temperature. This distinguishes from the flash and arc welding procedures and the old, slow speed electrical resistance "melt" weld in which a substantial amount of metal was actually fused or burned away from the edge. With these other methods of welding the condition of the edges of the strip which is formed into tubular shape is not particularly important as the surface of the edges is melted or burned away. However, as noted above, in high speed electrical resistance welding the edges should be presented to each other at the proper angle and, for best results, should have a fine and accurate finish.

It is among the objects of my invention, therefore, to provide an improved method of preparing the edges of a moving strip of metal for welding by the high speed electrical resistance methods. Other objects of my invention are: the provision of a method of edge conditioning which makes possible the feeding of mill edge strip directly to the forming mill and through the welding section of the machine in one continuous movement; the provision of a method of edge conditioning which insures uniform strip width and accurate angular relation of the edges of the strip as they pass through a welding throat; and the provision of a method whereby a highly polished, flat and smooth surface can be imparted to the metal strip as it moves at high speed to and through a forming mill preparatory to passing through a high speed electrical resistance welder.

The above and other objects of my invention will appear from the following description of an apparatus which is adapted to carry out my method and the following explanation of the important steps of my procedure, reference being had to the accompanying drawing, in which—

Figure 1 is a somewhat diagrammatic plan view of an apparatus for carrying out my method and forming a moving strip into tubular form preparatory to passing through a welder.

Figure 2 is a fragmentary cross-sectional view of the edge planishing rolls taken on line 2—2 of Figure 1.

Figure 3 is an illustrative cross-sectional view of one set of forming rolls taken on line 3—3 of Figure 1.

Figure 4 is a view generally similar to Figure 3 but illustrating the first pass of the fin planishing rolls.

Figure 5 is a view similar to Figure 4 illustrating the second pass of fin planishing rolls.

Steel strip, as it comes from the final pass of the rolling mill is known as "mill edge" strip. As there is no definite restriction on the edges of the strip as it passes through the rolling mill, variations in width and in the surface condition of the strip invariably occur. The strip edges are not absolutely plane and perpendicular to the surface of the strip and are usually somewhat rounded in contour. It has been common procedure to pass mill edge strip through a disc cutter trimming machine which shears off a small amount from each edge, the result being that the strip is of uniform width throughout and the edges are more or less plane and square. However, in such a shearing operation the strip is cut through by the shear only a part of the thickness of the metal and is broken through for the rest of the thickness. This results in an edge surface which has two distinct qualities, one relatively smooth where the actual shearing has taken place and the other relatively rough and granular where the metal has been broken. I have found that, although such sheared strip may be welded by high speed electrical resistance methods, the condition of the edges tends to produce a weld of non-uniform characteristics. This difficulty is particularly noticeable in heavy gauge stock such as from $\frac{1}{8}''$ to $\frac{3}{8}''$ thickness. It has been practically impossible, prior to my invention, to take mill edge strip and successfully run it through the forming and welding machine because of the irregularity in strip width and surface conditions. As the strip edge shearing above described is a separate operation from the rolling and requires separate handling of the strip it adds materially to the cost of sheared strip over that of mill edge strip.

My procedure makes possible the passing of mill edge or sheared edge strip directly to and through the forming and welding machines in a continuous, uninterrupted movement. As illustrated in Figure 1, the strip 1, which may be mill edge strip or material which has had its edges trimmed, moves in the direction of the arrow over the guide roll 2 through suitable entering rolls supported in the housing 3 and through the strip trimmer generally indicated at T. This trimmer may be of any desired form, for example of the type illustrated and claimed in the U. S. Patent application of Frederic M. Darner, Serial No. 260,811, filed March 9, 1939, now Patent No. 2,242,815 issued May 20, 1941.

In Figure 1 the trimmer includes adjustable entering guide rolls 4, leaving guide rolls 5, and cutting tools 6 and 7 suitably mounted for simultaneous adjustment toward and away from each other by means of the adjusting screw 8 operated by a hand wheel 9. As is clearly seen in Figure 1 the tools 6 and 7 are set to take a cut from the opposite edges of the strip. The tools are ground to provide a square edge and to give as smooth a surface as possible. The strip width is determined by the setting of the tools 6 and 7 and thus any irregularities in width of the mill edge strip are removed and the edges are placed in what might be termed a rough squared condition.

From the trimmer T the strip passes on to the planishing device P. This includes a frame 10 carrying slides 11 and 12 which in turn support the planishing rolls 13 and 14 respectively. As seen in Figure 2 these rolls 13 and 14 are grooved and have a flat strip edge engaging portion 15 at the bottom of the groove. By adjusting the screw 16 the slides 11 and 12 are moved toward or away from each other and thus the pressure of the rolls 13 and 14 against the strip edges may be varied. Where relatively wide strips are being handled it may be found desirable to employ pairs of guide rolls (not shown) just ahead of and just following the planishing rolls 13 and 14 to prevent undesirable buckling of the strip during the planishing operation.

By applying a high pressure against the clean, freshly trimmed edges of the strip they are planished to a high, dense surface finish which is perfectly adapted for high speed electrical resistance welding.

After leaving the planishing section P the strip passes through the forming mill F, which includes a series of forming rolls of usual type which bend the strip progressively into tubular form. As the strip approaches full tubular shape it is passed through a pair of rolls 17 and 18, roll 17 being a fin roll having a projecting fin 17' which engages the edges of the strip 1. By properly proportioning the diameter of the pass between the rolls 17 and 18 additional planishing pressure may be obtained between the faces of the fin 17' and the edges of the strip. If desired, at this point, the angle of the strip edges to the body of the strip may be varied slightly and this variation and further planishing may be carried further and completed in a second set of rolls 19 and 20, the roll 19 having a fin 19'. If it is desired to have either the inside or the outside portions of the strip edges abut, while the rest of the edges are spaced apart, as they enter the welding throat, this divergence from right angle edges may be obtained in the fin rolls 17, 18, 19 and 20. Of course it may also be formed directly by the cutting tools 6 and 7 and the planishing rolls 13 and 14. In some instances the rolls 17, 18, 19 and 20 may be used merely as forming rolls to complete the shape of the strip into tubular form and will not be used to influence or modify the edge surface imparted by the rolls of the planisher P.

The formed tube is indicated at 21 at the right hand end of Figure 1 and it will be understood that this tube moves continuously to and through the welding section of the machine (not shown but which may be of any desired and suitable form and either alternating or direct current).

By my improved method and apparatus rough or mill edge strip can be purchased at a relatively low price and fed continuously to and through the forming and welding sections at normal welding speed. Perfect edge surfaces are obtained which are smooth, plane, highly polished and of dense surface structure. By combining the strip trimming operation, which brings the strip to uniform width, with immediate planishing of the fresh cut strip edges before they have time to oxidize or pick up dirt, a perfect surface is obtained. The movement of the strip from the planishing to the forming section F is continuous and uninterrupted and the formed tube immediately enters the welder with clean, fresh, properly conditioned edges. Even strip which has been first trimmed to width can advantageously be edge conditioned by my method.

I have found that neither planishing alone nor trimming by means of cutting tools, such as 6 or 7, alone will give the most advantageous edge surface. However, by using the trimming and planishing steps successively the cut taken by the trimming tools makes possible successful planishing and the planishing rolls, acting upon the clean, freshly trimmed, flat or plane edges, gives a surface which is extremely advantageous in high speed electrical resistance welding.

Although I have described the illustrated apparatus for performing my method in considerable detail it will be understood by those skilled in the art that my drawing is more or less diagrammatic and that numerous variations and modifications may be made in the mechanism employed to carry out the steps of my process. Furthermore, the steps of my procedure may be varied without departing from the spirit of my invention, and I do not, therefore, wish to be limited to the particular forms and procedures described herein, but claim as my invention all embodiments thereof coming within the scope of the appended claims.

I claim:

1. In the continuous high speed electrical resistance welding of tubing or the like, the steps of moving a metal strip in the direction of its length and while so moving said strip simultaneously trimming the opposite edges thereof by cutting shavings therefrom, then simultaneously planishing the trimmed opposite edges to form smooth, plane, burr free edge surfaces, forming the moving strip into tubular form, causing the planished edges to abut, and welding said edges together by the electrical resistance method.

2. In the continuous high speed electrical resistance welding of tubing or the like, the steps of moving a metal strip in the direction of its length, trimming the edges of the moving strip by tool cuts extending the full thickness of the strip at each edge, rolling the trimmed edges under pressure to impart a smooth, dense surface finish thereto, causing the edges of the strip to abut and, while continuing the movement of the strip, welding the edges together by an electrical resistance weld.

3. The method of preparing the edges of a metal strip for electrical resistance welding into tubular form which includes the steps of making the strip uniform in width and providing it with freshly formed edges by simultaneously removing the metal from the opposite edges of the strip, and planishing said edges to impart smooth, dense, plane, burr free surfaces to each of them.

4. In the continuous electrical resistance welding of tubing or the like, the steps of moving an elongated metal strip in the direction of its length, cutting shavings from the edges of the moving strip by cutting tools to form parallel, burr free edges and give the strip uniform width, exerting planishing pressure on the trimmed, parallel strip edges, causing said edges to have welding contact, and welding said edges together by an electrical resistance weld, all while continuing the movement of said strip in the direction of its length.

5. In apparatus for the electrical resistance welding of tubing or the like, the combination of means for simultaneously cutting shavings from each edge of a strip, strip edge planishing means, tube forming means, tube welding means, and means for moving a strip continuously through said shaving, planishing, forming and welding means, said planishing means being disposed adjacent to and after said shaving means whereby the edge planishing operation will be carried out on freshly trimmed, burr free strip edges.

FREDERIC M. DARNER.